United States Patent [19]
Kanda

[11] Patent Number: 5,208,744
[45] Date of Patent: May 4, 1993

[54] AUTOMATIC ADJUSTMENT SYSTEM FOR A PROCESS CONTROLLER

[75] Inventor: Masae Kanda, Kanagawa, Japan

[73] Assignee: Kabushiki Kaisha Toshiba, Kanagawa, Japan

[21] Appl. No.: 655,031

[22] Filed: Feb. 14, 1991

[30] Foreign Application Priority Data

Feb. 23, 1990 [JP] Japan ................................. 2-42882

[51] Int. Cl.⁵ ............................................ G05B 13/02
[52] U.S. Cl. .................................. 364/162; 318/561; 364/152; 364/160
[58] Field of Search ............... 364/162, 160, 161, 163, 364/157, 148, 152, 180, 194; 318/561, 609, 610, 632

[56] References Cited

U.S. PATENT DOCUMENTS

| | | | |
|---|---|---|---|
| 3,976,981 | 8/1976 | Bowden | 364/160 X |
| 4,232,364 | 11/1980 | Bibbero | 364/159 X |
| 4,745,541 | 5/1988 | Vaniglia et al. | 364/162 X |
| 4,908,747 | 3/1990 | Lane et al. | 364/157 X |

FOREIGN PATENT DOCUMENTS 63-182710 7/1988 Japan .

*Primary Examiner*—Joseph Ruggiero
*Attorney, Agent, or Firm*—Finnegan, Henderson, Farabow, Garrett and Dunner

[57] ABSTRACT

A control supporting system for automatically determining control constants, including proportional gain, integral time and derivative time, of a controller used for controlling a given system in accordance with characteristics of the given system and control characteristics demanded of the controller.

The control supporting system includes an automatization level determining unit for determining the desired level of automatization of the controller, in accordance with the characteristics of the given system and the control characteristics demanded of the controller, an algorithm memory unit for storing a plurality of algorithms to determine the control constants, an algorithm selecting unit for selecting an algorithm from among the plurality of algorithms in accordance with the determined automatization level, and an algorithm execution unit for executing the algorithm to determine the control constants.

4 Claims, 3 Drawing Sheets

AUTOMATIC ADJUSTMENT SYSTEM FOR A PROCESS CONTROLLER

This invention relates to a control system, and more particularly to a control supporting system capable of determining the control constants of a controller of a control system.

Conventionally, in order to automatically determine the control constants of a controller, such as proportional gain integration time, and derivative time, many different control constant determining system have been employed.

One of the above control constant determining systems will be used in various types of tuning systems, such as a self-tuning system and an auto-tuning system. In these system, optimum control constants are determined by using the step response method, the limit cycle-method, etc, in which the operating value and the control value are input. Another one of these systems is the intelligent system, in which optimum control constants are determined whilst automatically altering the type or the size of control constants or expert system control.

However, actual plants have characteristics specific to each plant, such as dead time or high-order lag, or a combination of these.

These are a large number of such different characteristics. Therefore, no method, i.e. adjustment algorithm, for automatically determining optimum control constants at will adapted to a large number of plants has yet been developed.

Consequently, in conventional control supporting system in which control constants are automatically determined by using a controller unit, there is the problem that, although a corresponding benefit could be expected when the system is applied to a specific plant, appropriate control constants could not be determined when the system is applied to another plant.

This results in considerable inconvenience in that not only do such adjustment algorithms lack adaptability but also they may not be applied to a wide range of process controllers.

Plant control systems such as flow control systems do exist wherein the control constants of the controller can in fact be determined using a simple adjustment algorithm. However, when using the adjustment algorithm to determine the control constants for such a plant by a more precise and general technique, the problem arises that the load on the computer executing the algorithm becomes large, with the result that other necessary functions tend to be suspended.

SUMMARY OF THE INVENTION

It is an object of this invention to determine desirable control constants of a controller of a control system.

Another object is to make it possible to determine desirable control constants of a controller of a control system in accordance with characteristics of the control system and control characteristics demanded of the controller.

Additional objects and advantages will be obvious from the description which follows, or may be learned by practice of the invention.

The foregoing objects are achieved according to the present invention by providing a control supporting system for automatically determining control constants including proportional gain, integral time and derivative time of a controller for controlling a given system in accordance with characteristics of the given system and control characteristics demanded of the controller. The control supporting system includes automatization level determining means for determining the desired level of automatization of the controller, in accordance with the characteristics of the given system and the control characteristics demanded of the controller, algorithm memory means for storing a plurality of algorithms to determine the control constants, algorithm selecting means for selecting an algorithm from among the plurality of algorithms in accordance with the determined automatization level, and algorithm execution means for executing the algorithm to determine the control constants.

DETAILED DESCRIPTION OF THE PREFERRED EMBODIMENTS

The following is an explanation of an embodiment of this invention with reference to drawings.

Figure 1:
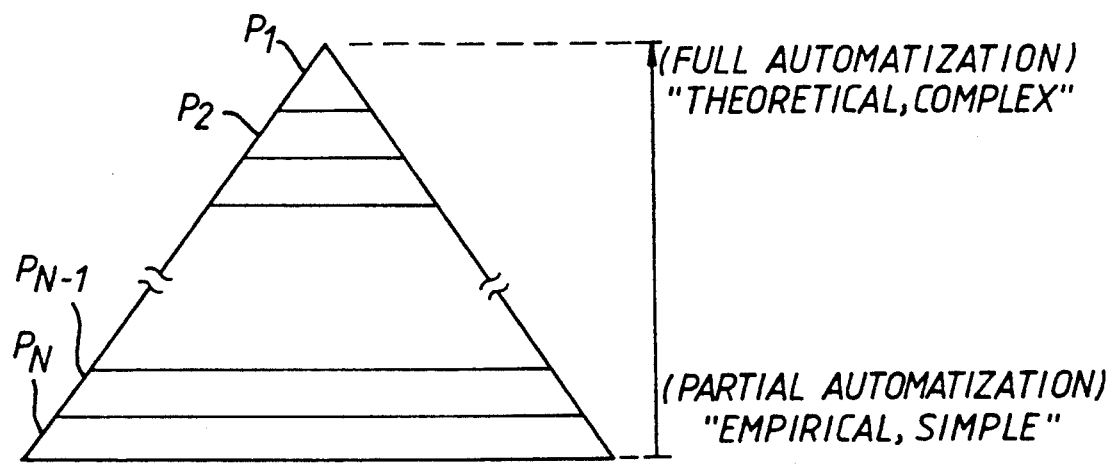
Fig. 1 is a diagram illustrating a basic concept of the invention.

FIG. 1 is a diagram illustrating a basic concept of the invention. A plurality of different adjustment algorithms are arranged in order in hierarchical levels from $P_n$ to $P_1$. The order of arrangement is that the higher the level of the algorithm, the less is the degree of human intervention it requires. That is, at the lower levels there are arranged simple trial-and-error adjustment algorithms for empirical, straightforward or partly automated systems. The range of systems and control characteristics demanded of the systems to which they can be applied is correspondingly limited. For example, they can only be applied to systems which can be approximated by a dead time + first-order lag and that which demand only a proportional and integration (PI) control operations.

On the other hand, at higher levels there are arranged progressively more systematic, theoretical, and general adjustment algorithms. The content of these algorithms is complex and they mostly require increased calculating time. For example, they can be applied to systems which can be approximated by a dead time + high order lag and which demand a 2 degree proportional, integration and derivative (PID) control operation.

A hierarchy of adjustment algorithms is therefore prepared beforehand, and an appropriate algorithm is selected in accordance with the characteristics of the system to be controlled and the demanded control characteristics. The control constants are then determined using this adjustment algorithm. When this is done, the above problems of the prior art can be solved.

Figure 3:
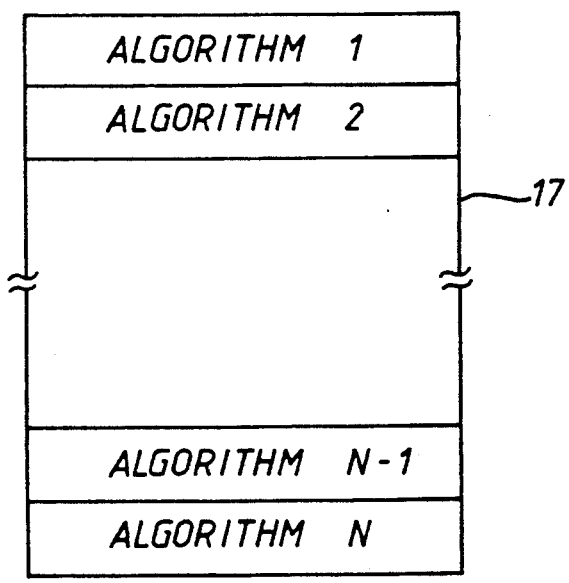
FIG. 3 is a diagram showing the conditions of an algorithm storage area of an algorithm memory unit shown in FIG. 1.
Figure 2:
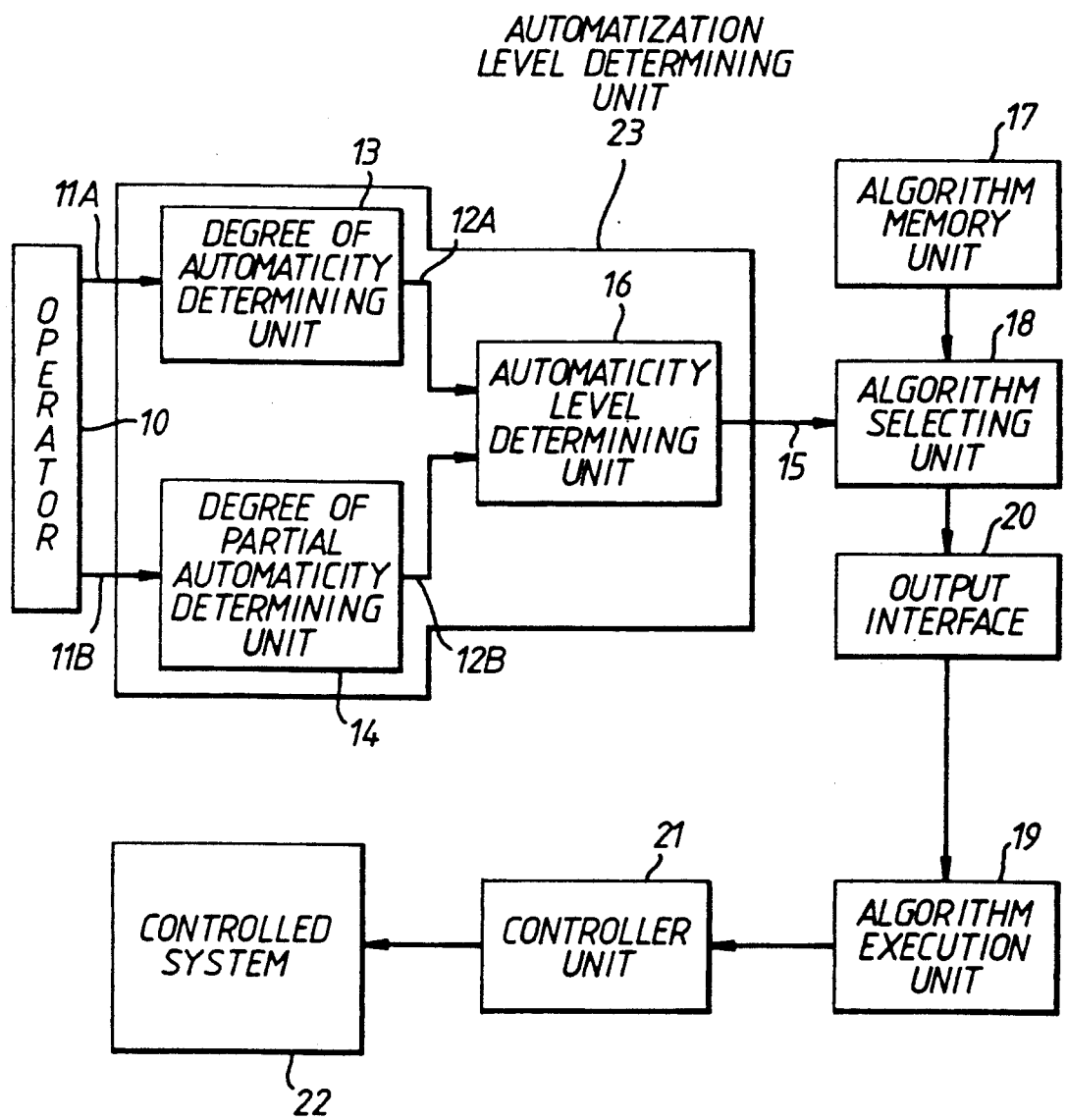
FIG. 2 is a block diagram of a control system according to the invention.

An embodiment of this invention based on the above basic concept is described with reference to FIG. 2, which shows a control system according to the invention. A degree of automaticity designating signal 11A, under the control of an external operator 10 is input to a degree of automaticity determining unit 13 for determining a degree of automaticity 12A. An adaptive level designating signal 11B indicating the degree of partial automaticity, under the control of an external operator, is input into the degree of partial automaticity determining unit 14 for determining a partial automaticity 12B. The degree of automaticity 12A indicates the degree of a change to be considered in the characteristics of the system. For example, a degree of considering system identification may be expressed in terms of a time interval when adaptive control is designated. On the other hand, the degree of partial automaticity 12B indicates the degree of consideration of the characteristics of a system and control characteristics demanded of a controller in the system. For example, the degree of complexity of the system characteristics in terms of control characteristics demanded of a controller of the system may be considered. An automaticity level determining unit 16 determines an automatization level 15 on receipt of the degree of automaticity 12A and the degree of partial automaticity 12B. An algorithm memory unit 17 hierarchically stores a set of algorithms consisting of adjustment algorithms as shown in FIG. 3. An algorithm selecting unit 18 selects an optimum adjustment algorithm in accordance with the automatization level 15 determined by the automaticity level determining unit 16. The adjustment algorithm transferred through an output interface 20 from the algorithm selecting unit 18, is executed in an algorithm execution unit 19. Control constants determined by the execution of the algorithm will be set in a controller 21 of a controlled system 22.

Figure 4:
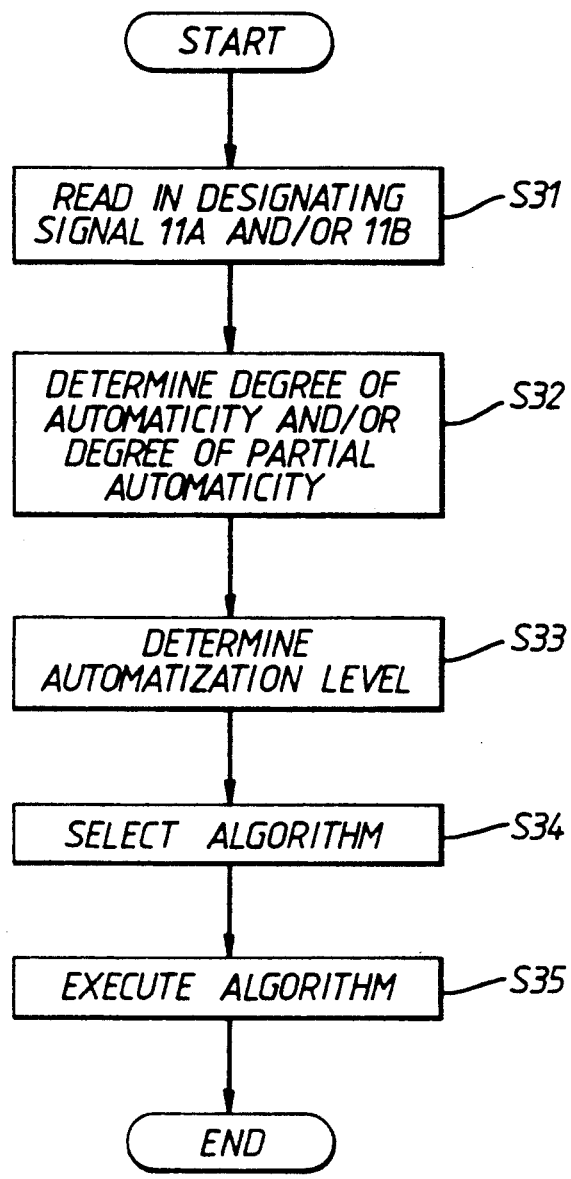
FIG. 4 is a flow-chart illustrating the steps performed by a control supporting system according to the invention.

The operation of the control supporting system is described with reference to FIG. 4. When at least one of the degree of automaticity designating signal 11A and/or the adaptive level designating signal 11B is received from outside the system under the control of an operator the degree of automaticity designating signal 11A or adaptive level designating signal 11B is read into the degree of automaticity determining unit 13 or degree of partial automaticity determining unit 14(S31). The degree of automaticity designating signal 11A or adaptive level designating signal 11B is then decoded and used to determine the degree of automaticity 12A or degree of partial automaticity 12B, which specifies the position in the hierarchical arrangement. For example, if, on receiving a degree of automaticity designating signal 11A, the degree of automaticity determining unit 13 decides on full automaticity, a degree of automaticity 12A is determined for designating the adjustment algorithm positioned at the top of the hierarchy. In contrast, in response to the adaptive level designating signal 11B, the degree of partial automaticity determining unit 14 determines (S32) the degree of partial automaticity 12B for designating an adjustment algorithm corresponding to a hierarchical level lower than full automatization. The automaticity level determining unit 16 them determines (S33) from degree of automaticity signal 12A or degree of partial automaticity signal 12B transmitted from degree of automaticity determining unit 13 or degree of partial automaticity determining unit 14 an automatization level signal 15, which can be matched beforehand with a hierarchical level of the set of algorithms in the algorithm memory unit 17, is transmitted to algorithm selecting unit 18. On receipt of this level signal 15, algorithm selecting unit 18 then selects (S34) a single adjustment algorithm corresponding to this level signal 15, reads this algorithm from algorithm memory unit 17, suitably adjusts the parameters of the algorithm, and then executes (S35) it, via output interface 20, in algorithm execution unit 19.

With the above embodiment, therefore, the hierarchical level of a hierarchy of algorithms which coincides with the desired control characteristics is determined based on a designation of degree of automaticity or designation of adaptive level which is input from outside, and based on this hierarchical level, the optimum algorithm is then extracted from the set of algorithms in the unit 17 and stored in algorithm execution unit 19. control constants can therefore be determined using an adjustment algorithm that is matched to the characteristics of the system to be controlled, the control characteristics demanded of the system or an adjustment algorithm can be constructed that is suitably matched to the specification of control characteristics demanded by the user, and control constants can be reliably determined employing this constructed adjustment algorithm. Furthermore, the load on the computer can be reduced to the minimum still satisfying the demanded specification. Also, automation of the adjustment becomes possible for a wide range of plants, which previously could not be covered by adjustment algorithms. This can be fully adapted to the control of a wide range of systems.

In the above embodiment, a configuration is described in which the selected adjustment algorithm is read from the set of algorithms and transferred to algorithm execution unit 19. However, a configuration could be adopted in which, for example, the algorithm is directly permanently stationed in the actual program area, without going through a process of transfer. Apart from this, the invention can be implemented in various modified ways without departing from the scope of its essence.

As described above, with this invention, a hierarchy of algorithms, which are devised beforehand, is prepared corresponding to various types of systems to be controlled. A single adjustment algorithm is then read which matches the user's demanded specification and the system to be controlled and this executed. Optimum control constants for the system to be controlled can therefore be determined and the computer can be utilized with its load reduced to a minimum whilst still satisfying the demanded specification. Automation of adjustment can therefore be achieved for a wide range of system to be controlled.

What is claimed is:

1. A control supporting system for automatically determining control constants, including proportional gain, integral time and derivative time, of a controller used for controlling a given system in accordance with characteristics of the given system and control characteristics demanded of the controller, the control supporting system comprising:

automatization level determining means for determining the desired level of automatization of the controller in accordance with the characteristics of the given system and the control characteristics demanded of the controller;

algorithm memory means for storing a plurality of algorithms to determine the control constants;

algorithm selecting means for selecting an algorithm from among the plurality of algorithms in accordance with the determined automatization level; and algorithm execution means for executing the algorithm to determine the control constants.

2. The control supporting means of claims 1, wherein the automatization level determining means includes degree of automaticity determining means for determining means for determining the degree of automaticity based on the change to be considered in the characteristics of the given system, degree of partial automaticity determining means for determining a degree of partial automaticity based on the degree of consideration of the characteristics of the given system and the control characteristics of the given system and the control characteristics demanded of the controller, and automaticity level determining means for determining the automatization level in accordance with the degree of automaticity and the degree of partial automaticity.

3. A method for automatically determining control constants, including proportional gain, integral time and derivative time, of a controller used for controlling a given system in accordance with characteristics of the given system and control characteristics demanded of the controller, the method comprising the steps of:

determining the desired level of automatization of the controller, in accordance with the characteristics of the given system and the control characteristics demanded of the controller;

storing a plurality of algorithms to determine the control constants;

selecting an algorithm from among the plurality of algorithms in accordance with the determined automatization level; and executing the algorithm to determine the control constants.

4. The method of claim 3, wherein the step of determining the automatization level includes determining a degree of automaticity based on the change to be considered in the characteristics of the given system, determining a degree of partial automaticity based on the degree of consideration of the characteristics of the given system and the control characteristics of the given system and the control characteristics demanded of the controller, and determining the automatization level in accordance with the degree of automaticity and the degree of partial automaticity.

* * * * *